United States Patent [19]

Hluchyj et al.

[11] Patent Number: 5,497,375
[45] Date of Patent: Mar. 5, 1996

[54] DEVICE AND METHOD FOR ATM END SYSTEM CELL FLOW REGULATION

[75] Inventors: Michael G. Hluchyj, Wellesley; Nanying Yin, Newton, both of Mass.

[73] Assignee: Motorola, Inc., Schaumburg, Ill.

[21] Appl. No.: 176,818

[22] Filed: Jan. 5, 1994

[51] Int. Cl.$^6$ .................................................. H04J 3/24
[52] U.S. Cl. .............................. 370/94.1; 370/60; 370/79; 370/85.2
[58] Field of Search .......................... 370/94.1, 60, 110.1, 370/60.1, 79, 85.2, 84, 85.3, 85.1

[56] References Cited

U.S. PATENT DOCUMENTS

| | | | |
|---|---|---|---|
| 4,800,521 | 1/1989 | Carter et al. | 364/900 |
| 5,163,046 | 11/1992 | Hahne et al. | 370/94.1 |
| 5,193,151 | 3/1993 | Jain | 370/94.1 |
| 5,274,625 | 12/1993 | Derby et al. | 370/94.1 |
| 5,274,641 | 12/1993 | Shobatake et al. | 370/94.1 |
| 5,291,481 | 3/1994 | Doshi et al. | 370/79 |
| 5,311,513 | 5/1994 | Ahmadi et al. | 370/94.1 |
| 5,313,454 | 5/1994 | Bustini et al. | 370/60 |
| 5,347,511 | 9/1994 | Gun | 370/60 |

Primary Examiner—Douglas W. Olms
Assistant Examiner—Shick Hom
Attorney, Agent, or Firm—Darleen J. Stockley

[57] ABSTRACT

An end system cell flow regulator includes a congestion state determiner (208), a data source (202), a cell scheduler (206), and a leaky bucket monitor (204). The congestion state determiner typically decides congestion state based on feedback information and a timer. The data source typically further includes a cell generator, a cell buffer, a cell flow switch and a cell buffer state determiner. The cell scheduler further includes a DCR, Dynamic Cell Rate, determiner and a cell rate determiner, wherein the cell scheduler decides the next cell time for transmission based on the cell buffer state, congestion state and leaky bucket state. The cell rate determiner determines if the cell rate is set to DOR or PCR, Peak Cell Rate, based on the leaky bucket and cell buffer states. The DCR determiner establishes the DCR rate based on congestion state and cell buffer state.

28 Claims, 7 Drawing Sheets

DEVICE AND METHOD FOR ATM END SYSTEM CELL FLOW REGULATION

FIELD OF THE INVENTION

This invention relates generally to devices and methods for network communication, and more particularly to network communication in a cell relay asynchronous transfer mode (ATM) network.

BACKGROUND

Figure 1:
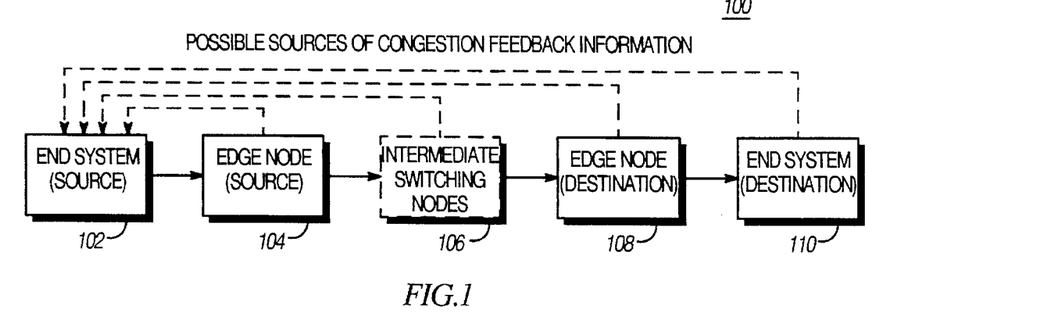
FIG. 1 is a block diagram illustrating ATM source and destination end systems coupled with an ATM network.

FIG. 1, numeral 100, shows an ATM system in which ATM 5 source (102) and destination (110) end systems are coupled with an ATM network. The ATM network includes: a source edge node (104), a destination edge node (108), and, where selected, one or more intermediate switching nodes (106). ATM cells generated by the source end system are transmitted via the source edge node to intermediate nodes, then to a destination edge node, and lastly to the destination end system. Clearly, ATM networks are subject to congestion when the traffic offered to the network exceeds the capacity of the network. Thus, congestion conditions need to be controlled in order to guarantee, for each ATM connection, the Quality of Service (QOS) negotiated between the communicating end systems and ATM network during call establishment.

Hence, the goals of an effective ATM congestion control scheme should include: (1) guaranteeing that the Quality of Service (QOS) provided to each connection should, at a minimum, satisfy the agreed QOS negotiated during connection establishment; (2) allowing a connection to exceed its agreed throughput QOS if there is unused or unallocated capacity along its path through the network; and (3) in a congested network, informing connections that are exceeding their negotiated traffic parameters of the congested condition and giving an opportunity to reduce rate before the network begins to discard traffic in excess of the negotiated traffic parameters.

Controlling congestion in an ATM network requires effectively regulation of the flow of cells for each connection entering the network at the source end system. Making effective use of unallocated or unused capacity in the network requires feedback signaling to the end systems to properly regulate the flow of cells entering the network. It is important, however, to couple this cell flow regulation to the agreed QOS guarantees for the connection. Even though a number of types of congestion control exist, no existing techniques are available that effectively control the cell flow for a connection from an end system and couple this with QOS guarantees. Thus, there is a need for a device and method for regulating cell flow between ATM source and destination end systems such that congestion is controlled and unused or unallocated capacity is utilized while maintaining QOS guarantees.

DETAILED DESCRIPTION OF A PREFERRED EMBODIMENT

The device and method of the present invention provide ATM end system cell flow regulation for adjusting and monitoring the cell flow for each ATM connection emanating from the end system. An ATM end system includes any device (e.g., workstation, front end processor, bridge, router) that is segmenting higher layer Protocol Data Units (PDUs) into cells via an adaptation protocol. In one embodiment, functional blocks of elements of the device of the present invention, illustrated in FIG. 2, numeral 200, include a data source (202), leaky bucket monitor (204), cell scheduler (206), and congestion state determiner (208). The cell scheduler (206) is the central controller of this device. This central controller schedules the transmission time of each cell into the network by transmitting a send-cell signal to the data source, where the transmission time for the send-cell signal is based on congestion feedback information, current cell rate monitored by the leaky bucket monitor (204), and the data source (202) status (i.e., if there are cells available to send). The congestion feedback information is utilized by the congestion state determiner (208) to determine the congestion state. Congestion feedback information is typically provided by at least one of: the source edge node, intermediate node, destination edge node, and the destination end system. The following description specifically describes the cases of two congestion states (normal and congested) and three congestion states (normal, mild and moderate), although the invention may clearly be extended to more congestion states.

Figure 3:
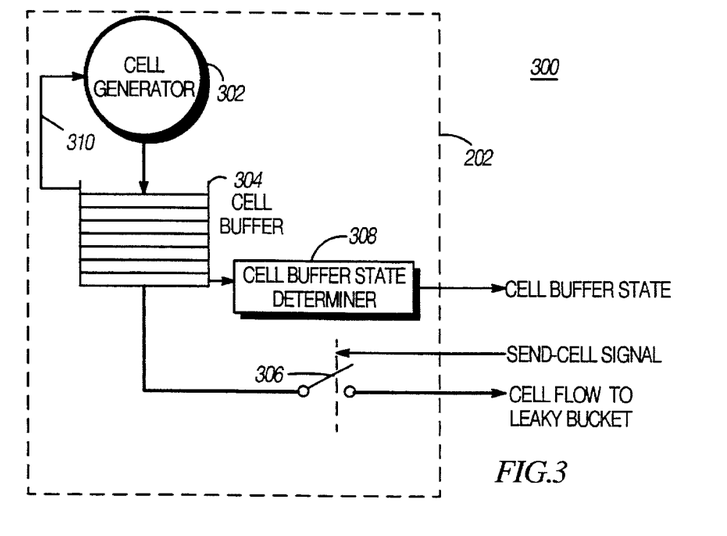
FIG. 3 is a block diagram of functional elements of one embodiment of the data source element of FIG. 2.

FIG. 3, numeral 300, illustrates a block diagram of functional elements of one embodiment of the data source element (202) of the present invention, wherein the data source element includes: an ATM cell generator (302), a cell buffer (304), a cell flow switch (306), and a cell buffer state determiner (308). ATM cells generated through the adaptation of higher level PDUs wait in the cell buffer for transmission. One cell is transmitted for each send-cell indication signalled by the cell scheduler (206). When the cell buffer state (i.e., cell available or not) is changed, the cell buffer state is indicated to the cell scheduler (206). To prevent the cell buffer from overflowing, a cell buffer full indication (310) is used to stop the flow of cells from the ATM cell generator.

Figure 4:
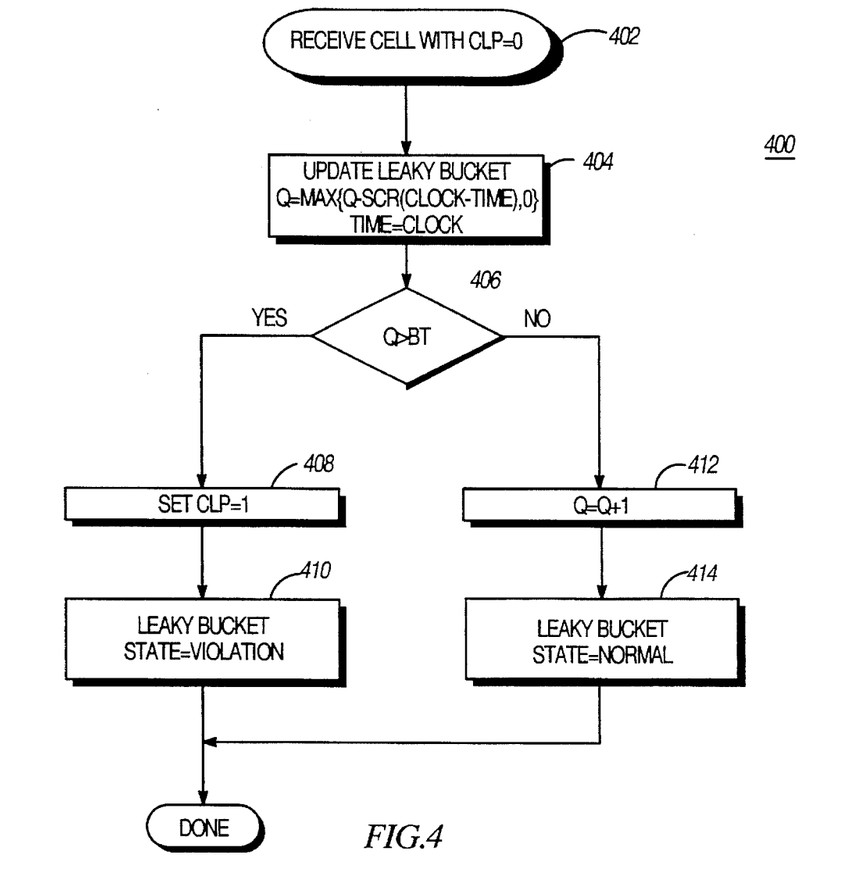
FIG. 4 shows a flow chart of one embodiment of the steps of the operation of the leaky bucket monitor element of FIG. 2.

A Sustainable Cell Rate (SCR), and an associated Burst Tolerance (BT), for each connection is monitored by a leaky bucket monitor (204). One embodiment of the steps of the operation of the leaky bucket monitor is shown in a flow chart, FIG. 4, numeral 400, where a leaky bucket parameter Q has an initial value Q=0. When a cell passing through the leaky bucket monitor (204) is determined to be in violation (or nonconforming) of the SCR and BT traffic parameters negotiated during call set-up, the CLP field in the cell header is set to 1 and the leaky bucket state is set to violation. Otherwise, CLP is set to 0 and the leaky bucket state is set to normal. The leaky bucket monitor (204) signals the leaky bucket state changes to the cell scheduler (206).

Figure 2:
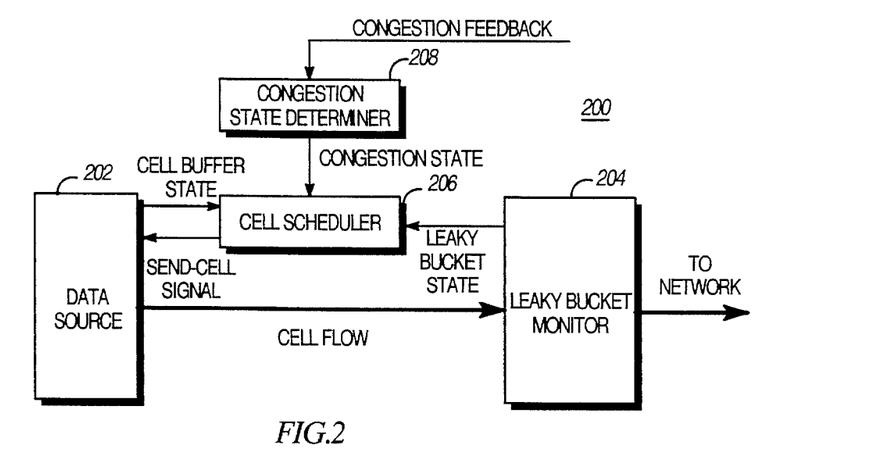
FIG. 2 is a block diagram illustrating functional blocks of elements of one embodiment of the device of the present invention.
Figure 5:
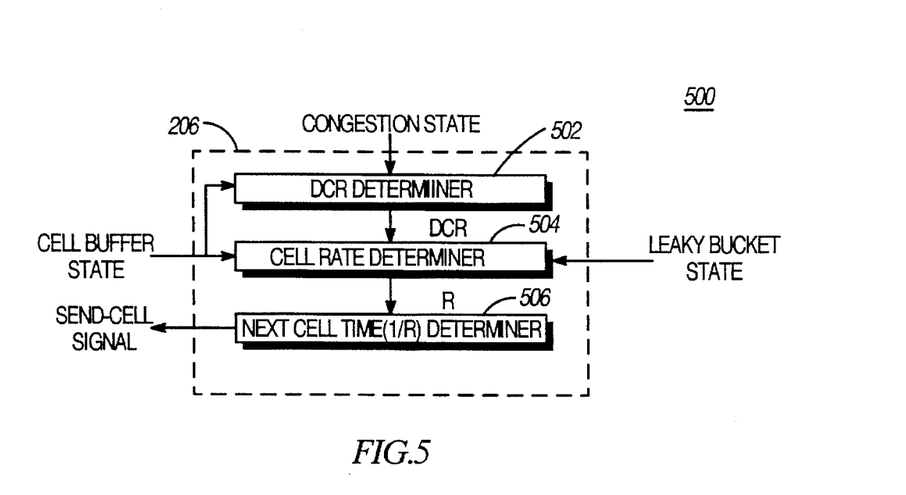
FIG. 5 shows a functional block diagram of the preferred embodiment of the cell scheduler (206) of FIG. 2.

FIG. 5, numeral 500, shows a functional block diagram of the preferred embodiment of the cell scheduler (206) of FIG. 2. The cell scheduler (206) typically includes a Dynamic Cell Rate (DCR) determiner (502), a cell rate determiner (504), and a Next Cell Time Determiner (506). The DCR determiner (502) establishes the DCR, which varies between the SCR and the Peak Cell Rate (PCR), according to the congestion state and the cell buffer state. The PCR is determined along with the SCR and BT during call establishment for the connection, where SCR≦PCR. The cell rate determiner (504) determines whether the cell flow rate should be based on PCR or the current value of DCR, where the decision on which rate to use is based on transitions in the leaky bucket state and cell buffer state. The current cell rate R (i.e., PCR or DCR) established by the cell rate determiner (504) is used by the Next Cell Time Determiner (506) to schedule the next time (i.e., 1/R) a cell is allowed to enter the network. The permission to send one cell is signalled to the data source via the send-cell signal.

Figure 6:
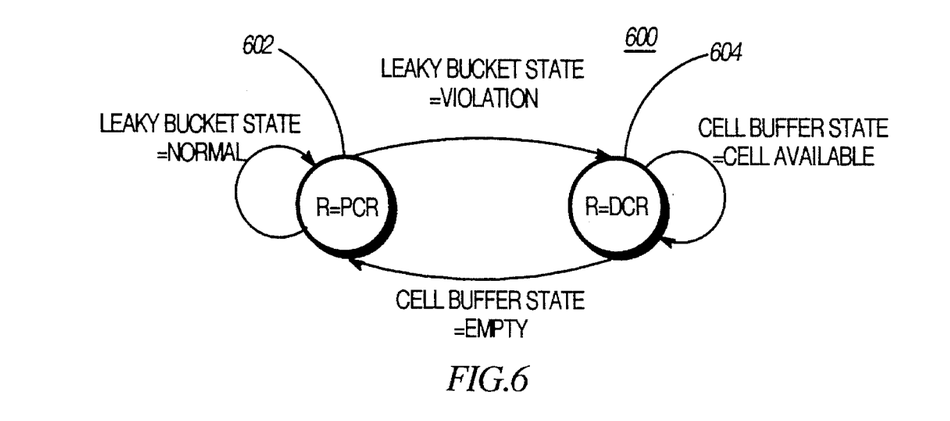
FIG. 6 is a state transition diagram for the cell rate determiner (504) of FIG. 5.

FIG. 6, numeral 600, is a state transition diagram for the cell rate determiner (504) of FIG. 5. The state transition is triggered by a leaky bucket state change or a cell buffer state change. The system is initially in the R=PCR state (602) where the leaky bucket monitor (204) is in the normal state (generally referred to as the leaky bucket having "permits" to send cells at the PCR). SCR and BT, along with the current value of the leaky bucket Q parameter, determine the number of cells that can be transmitted continuously at the PCR and still be within the negotiated traffic parameters. If this limit is exceeded and the leaky bucket state changes to violation, the cell rate determiner (504) changes to the R=DCR state (604) and will remain in this state as long as there are cells waiting in the data source cell buffer (304) to be transmitted. When the cell buffer empties (determined by the cell buffer state determiner (308) in the data source (202)), this change is signalled to the cell scheduler (206) and causes the cell rate determiner (504) to transition back to the R=PCR state (602).

Figure 7:
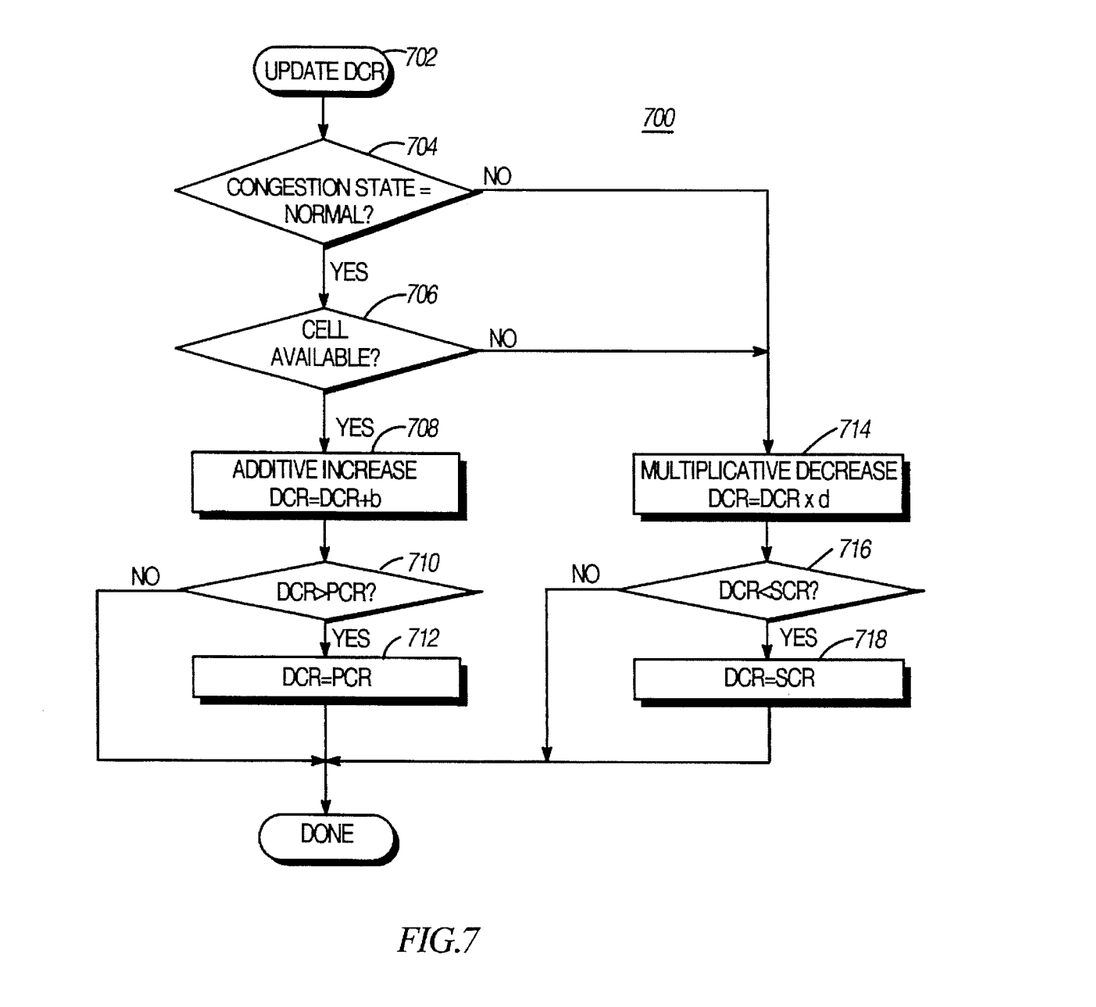
FIG. 7 is a flow chart illustrating one embodiment of steps implemented by the DCR determiner (502) of FIG. 5 where there are two congestion states (congested and normal).

FIG. 7, numeral 700, is a flow chart illustrating one embodiment of steps implemented by the DCR determiner (502) where there are two congestion states (congested and normal). The normal and congested states are predetermined. The updating of the DCR determiner (702) is done periodically. For example, a value of 25% of the typical round trip time (RTT) in the network is a workable update time. Utilizing smaller update intervals makes the device of the present invention somewhat more responsive to congestion state changes. On the establishment of a new connection, DCR is initially set to SCR. The DCR determiner adjusts the cell rate by additive increase algorithm(s) (708) when the congestion state is normal (704, YES) and a cell is available (706,YES) and by multiplicative decrease algorithm(s) (714) when the congestion state fails to be normal (704, NO) or, alternatively, when the congestion state is normal and a cell is unavailable (706, NO). Use of additive increase (708) and multiplicative decrease (714) algorithms provides for a stable operation and allows fair sharing of unallocated or unused capacity in the network. For example, the multiplicative decrease factor d may typically be set to the equivalent of 0.875 for every two round trip times in the network (i.e., with an update interval of RTT/4, $d=(0.875)^{0.125}=0.983$). The increase increment b may typically be set to the equivalent of SCR/16 for every two round trips (i.e., with an update interval of RTT/4, b= SCR/128). For "best effort" traffic with SCR=0, b may be set to 0.1% of the lowest capacity internodal link along the path of the connection for the RTT/4 update interval. Upon adjusting the DCR by an additive increase (708), the magnitude of DCR is compared with PCR (710). Where DCR is less than or equal to PCR (710, NO), the DCR determination is completed, and where DCR is greater than PCR (710, YES), DCR is set equal to PCR (712) and the DCR determination is completed. Upon adjusting the DCR by an multiplicative decrease (714), the magnitude of DCR is compared with SCR (716). Where DCR is greater than or equal to SCR (716, NO), the DCR determination is completed, and where DCR is less than SCR (716, YES), DCR is set equal to SCR (718) and the DCR determination is completed.

As is clear from FIG. 7, when the congestion state is normal and the cell buffer is empty, DCR is multiplicatively decreased (714). This is done for two reasons. First, since the end system is not contributing any cell traffic to the network for this connection, its assessment of the path congestion state has to be in the context of its not contributing any load along this path. Hence, when the connection is idle, the algorithm drives DCR to SCR. Second, depending on the implementation of the congestion feedback mechanism, feedback may only be provided to connections that are actively transmitting cells. Hence, while a connection is waiting for the generation of more cells, it may conservatively view its path through the network as being congested and reduce the DCR value toward SCR.

Figure 8:
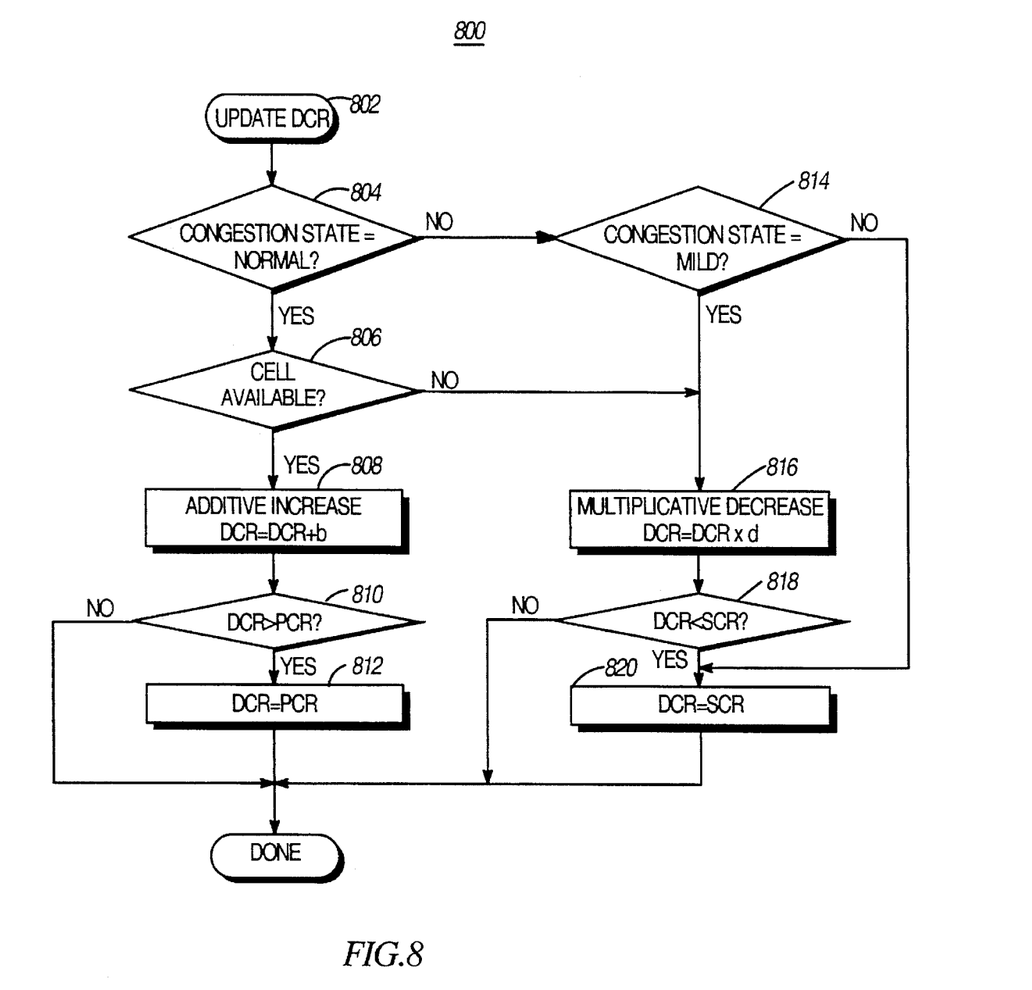
FIG. 8 is a flow chart illustrating one embodiment of steps implemented by the DCR determiner (502) of FIG. 5 where there are three congestion states (normal, mild and moderate).

FIG. 8, numeral 800, is a flow chart illustrating one embodiment of steps implemented by the DCR determiner of FIG. 5 where there are three congestion states (normal, mild and moderate). The normal, mild and moderate congestion states are predetermined. The DCR determiner adjusts the cell rate by additive increase algorithm(s) (808) when the congestion state is normal (804, YES) and a cell is available (806, YES) and by multiplicative decrease algorithm(s) (816) when one of: (1) the congestion state fails to be normal (804, NO) and is determined to be mild (814, YES), and (2) the congestion state is normal (804, YES) and a cell is unavailable (806, NO). As above, use of additive increase (808) and multiplicative decrease (816) algorithms tends to provide for a stable operation and allows fair sharing of unallocated or unused capacity in the network. The multiplicative decrease factor d and the increase increment b may typically be set as described above.

In the steps of FIG. 8, upon adjusting the DCR by an additive increase (808), the magnitude of DCR is compared with PCR (810). Where DCR is less than or equal to PCR (810, NO), the DCR determination is completed, and where DCR is greater than PCR (810, YES), DCR is set equal to PCR (812) and the DCR determination is completed. Upon adjusting the DCR by a multiplicative decrease (816), the magnitude of DCR is compared with SCR (818). Where DCR is greater than or equal to SCR (818, NO), the DCR determination is completed, and where DCR is less than SCR (818, YES), DCR is set equal to SCR (820) and the DCR determination is completed. As in FIG. 7, when the congestion state is normal and the cell buffer is empty, DCR is multiplicatively decreased (816).

The additional congestion state allows a distinction between mild and moderate congestion to be made in the network. Thus, where the congestion state is mild, DCR is decreased multiplicatively (816) as described before, and where the congestion state is moderate, i.e., the congestion state fails to be mild, the DCR is reduced to SCR (820). By reducing DCR to SCR, any significant queue build up during moderate congestion is reduced.

Figure 9:
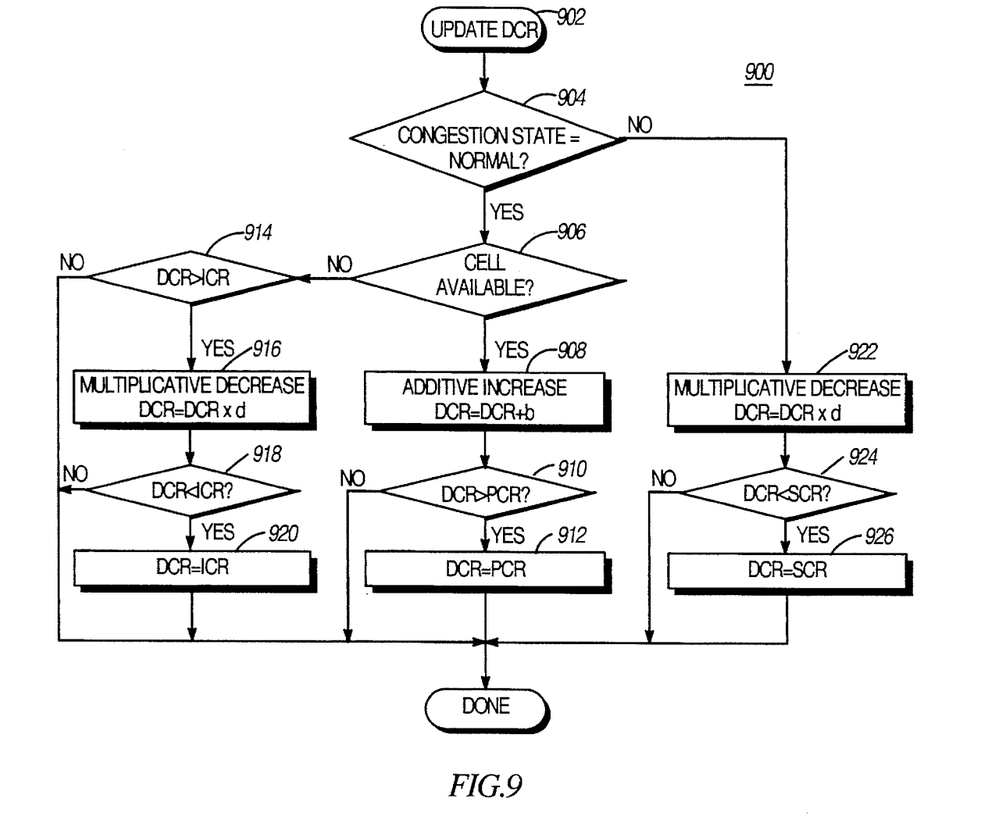
FIG. 9 is a flow chart illustrating one embodiment of steps implemented by the DCR determiner (502) of FIG. 5 with two congestion states (congested and normal) and an Initial Cell Rate (ICR), with $SCR \leq ICR \leq PCR$.

FIG. 9, numeral 900, is a flow chart illustrating one embodiment of steps implemented by the DCR determiner of FIG. 5 with two congestion states (congested and normal) and an Initial Cell Rate (ICR), with SCR≦ICR≦PCR. The DCR determiner adjusts the cell rate by additive increase and multiplicative decrease algorithms based on the two congestion states and cell buffer state in similar fashion as described before in the context of FIG. 7. The basic difference between FIG. 7 and FIG. 9 is that when the cell buffer is empty (906, NO), DCR is driven to ICR by the multiplicative decrease algorithm (916) when DCR>ICR (914, YES), and remains unchanged when DCR≦ICR (914, NO). Also, initially DCR=ICR (rather than SCR). This allows the device of the present invention to introduce traffic at a higher rate than SCR when the cell rate determiner transitions to R=DCR (FIG. 6).

In FIG. 9, the DCR determiner adjusts the cell rate by additive increase algorithm(s) (908) when the congestion state is normal (904, YES) and a cell is available (906, YES) and by multiplicative decrease algorithm(s) (922, 916) when one of: (1) the congestion state fails to be normal (904, NO), and (2) the congestion state is normal (904, YES), a cell is unavailable (906, NO), and DCR>ICR (914, YES). As above, use of additive increase (908) and multiplicative decrease (922, 916) algorithms tends to provide for a stable operation and allows fair sharing of unallocated or unused capacity in the network. The multiplicative decrease factor d and the increase increment b may typically be set as described above.

In the steps of FIG. 9, upon adjusting the DCR by an additive increase (908), the magnitude of DCR is compared with PCR (910). Where DCR is less than or equal to PCR (910, NO), the DCR determination is completed, and where DCR is greater than PCR (910, YES), DCR is set equal to PCR (912) and the DCR determination is completed. Where the congestion state fails to be normal (904, NO), upon adjusting the DCR by a multiplicative decrease (922), the magnitude of DCR is compared with SCR (924). Where DCR is greater than or equal to SCR (924, NO), the DCR determination is completed, and where DCR is less than SCR (924, YES), DCR is set equal to SCR (926) and the DCR determination is completed.

In contrast to FIG. 7, for the steps illustrated in FIG. 9, when the congestion state is normal and the cell buffer is empty, DCR is compared with ICR (914). Where DCR≦ICR (914, NO), the DCR determination is completed.

Where DCR>ICR (914, YES), DCR is adjusted by a multiplicative decrease (916) and DCR is again compared to ICR (918). Where DCR≧ICR (918, NO), the DCR determination is completed. Where DCR<ICR (918, YES), DCR is set equal to ICR (920) and the DCR determination is completed.

Figure 10:
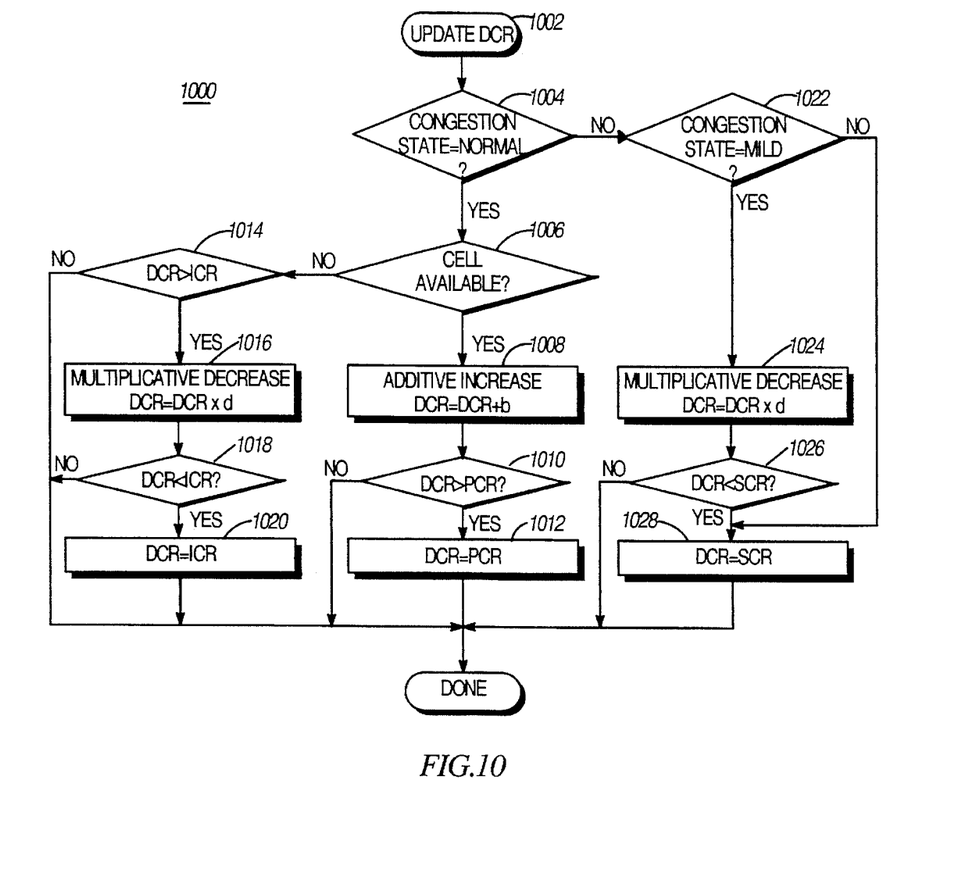
FIG. 10 is a flow chart illustrating one embodiment of steps implemented by the DCR determiner (502) of FIG. 5 with three congestion states (normal, mild and moderate) and ICR, with $SCR \leq ICR \leq PCR$.

FIG. 10, numeral 1000, is a flow chart illustrating one embodiment of steps implemented by the DCR determiner (502) of FIG. 5 with three congestion states (normal, mild and moderate) and ICR, with again SCR≦ICR≦PCR. The normal, mild and moderate congestion states are predetermined. FIG. 10 shows steps in accordance with FIG. 9, but with the addition of the mild and moderate congestion states that allow an immediate transition to SCR (as previously described in the context of FIG. 8) when there is moderate congestion along the path of the connection in the network.

In FIG. 10, the DCR determiner adjusts the cell rate by additive increase algorithm (1008) when the congestion state is normal (1004, YES) and a cell is available (1006, YES) and by multiplicative decrease algorithm(s) (1024, 1016) when one of: (1) the congestion state fails to be normal (1004, NO), and the congestion state is mild (1022, YES), and (2) the congestion state is normal (1004, YES), a cell is unavailable (1006, NO), and DCR>ICR (1014, YES). As above, use of additive increase (1008) and multiplicative decrease (1024, 1016) algorithms tends to provide for a stable operation and allows fair sharing of unallocated or unused capacity in the network. The multiplicative decrease factor d and the increase increment b may typically be set as described above.

In the steps of FIG. 10, upon adjusting the DCR by an additive increase (1008), the magnitude of DCR is compared with PCR (1010). Where DCR is less than or equal to PCR (1010, NO), the DCR determination is completed, and where DCR is greater than PCR (1010, YES), DCR is set equal to PCR (1012) and the DCR determination is completed. Where the congestion state fails to be normal (1004, NO) and the congestion state is mild (1022, YES), upon adjusting the DCR by an multiplicative decrease (1024), the magnitude of DCR is compared with SCR (1026). Where DCR is greater than or equal to SCR (1026, NO), the DCR determination is completed, and where DCR is less than SCR (1026, YES), DCR is set equal to SCR (1028) and the DCR determination is completed. Where the congestion state fails to be normal and also fails to be mild (1004, NO; 1022, NO), DCR is set equal to SCR (1028) and the DCR determination is completed.

In FIG. 10, when the congestion state is normal and the cell buffer is empty, DCR is compared with ICR (1014). Where DCR≦ICR (1014, NO), the DCR determination is completed. Where DCR>ICR (1014, YES), DCR is adjusted by a multiplicative decrease (1016) and DCR is again compared to ICR (1018). Where DCR≧ICR (1018, NO), the DCR determination is completed. Where DCR<ICR (1018, YES), DCR is set equal to ICR (1020) and the DCR determination is completed.

Figure 11:
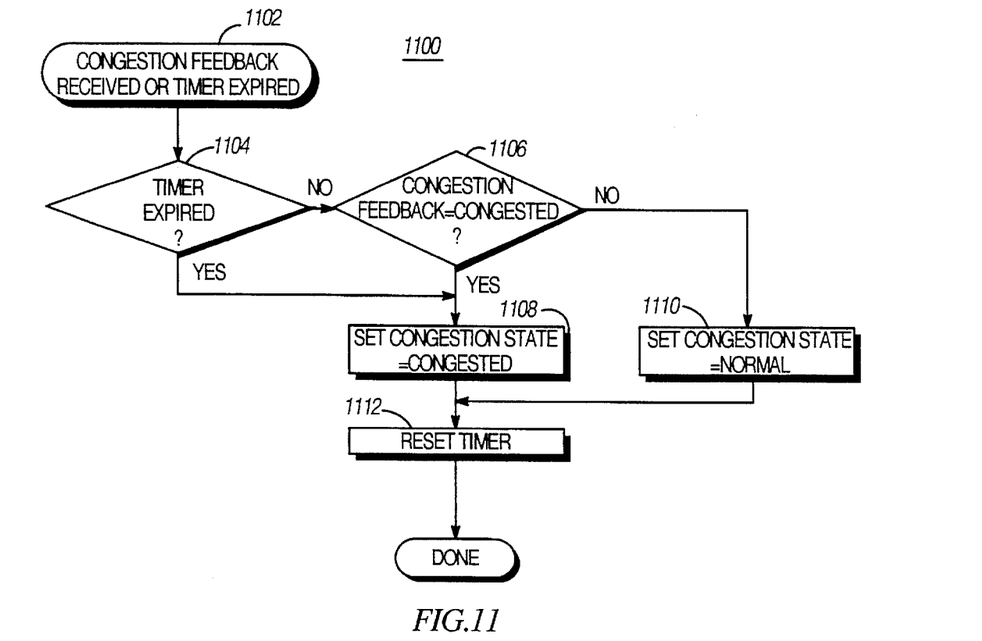
FIG. 11 is a flow chart illustrating one embodiment of steps implemented by the congestion state determiner (208) of FIG. 2 with two congestion states (congested and normal).

FIG. 11, numeral 1100, is a flow chart illustrating one embodiment of steps implemented by the congestion state determiner (208) of FIG. 2 with two congestion states (congested and normal). Congested and normal states are predetermined. The congestion state determiner is triggered based (1102) on one of: (1) receiving congestion feedback information from the network, and (2) having a timer expire. If the timer expires (1104, YES) before the congestion feedback information is received, the congestion state is set to the congested state (1108). Otherwise, the congestion feedback information is mapped directly to the congestion state. Where the congestion feedback information indicates a congested state (1106, YES), the congestion state is set to the congested state (1108). Where the congestion feedback information indicates a uncongested state (1106, NO), the congestion state is set to normal (1110). Whenever the congested state is updated (1108, 1110), the timer is reset (1112). The use of the timer prevents the cell flow regulator from continuing to additively increase its rate when the last update indicated a normal state but, due to a fault in the network, up-to-date feedback information is prevented from being received by the source end system. Under these circumstances, the end system conservatively assumes that the path through the network supporting the connection is congested.

Figure 12:
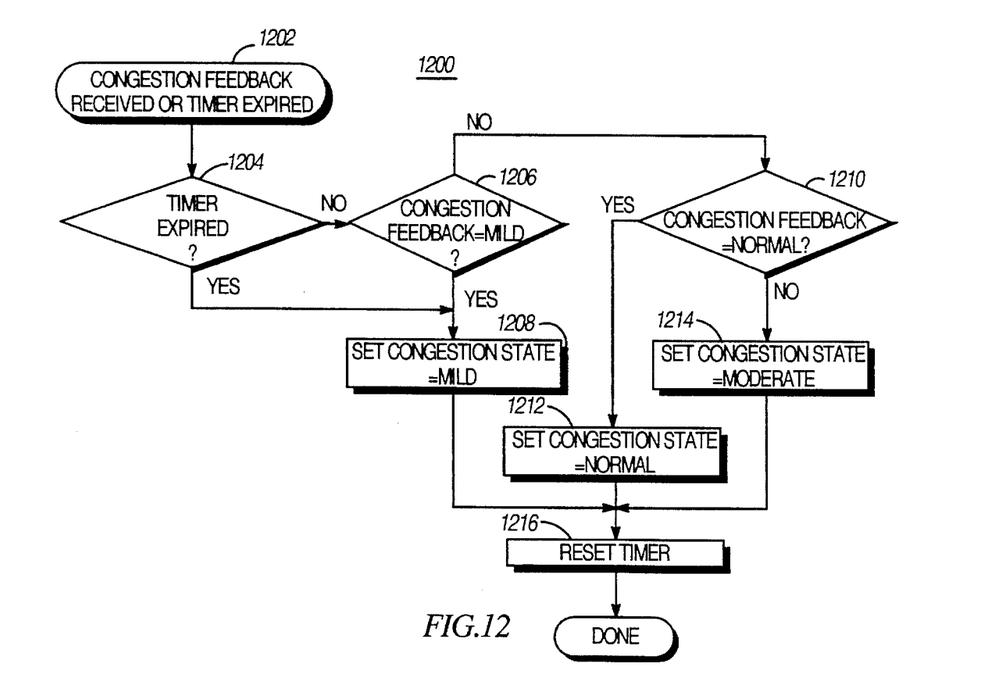
FIG. 12 is a flow chart illustrating one embodiment of steps implemented by the congestion state determiner (208) of FIG. 2 with three congestion states (normal, mild, and moderate).

FIG. 12, numeral 1200, is a flow chart illustrating one embodiment of steps implemented by the congestion state determiner (208) of FIG. 2 with three congestion states (normal, mild, and moderate). Normal, mild, and moderate congestion states are predetermined. Where these three congestion states are utilized, the congestion state determiner utilizes steps similarly to those of FIG. 11, except that when the timer expires before congestion feedback information is received (1204, YES), the congestion state is set to the mild congestion state. Thus, the congestion state determiner is triggered based (1202) on one of: (1) receiving congestion feedback information from the network, and (2) having a timer expire. If the timer expires (1204, YES) before the congestion feedback information is received, the congestion state is set to the mild state (1208). Otherwise, the congestion feedback information is mapped directly to the congestion state. Where the congestion feedback information indicates a mild state (1206, YES), the congestion state is set to the mild state (1208). Where the congestion feedback information fails to show a mild congestion state (1206, N0) and shows a normal congestion state (1210, YES), the congestion state is set to normal (1212). Where the congestion feedback information fails to show a mild congestion state (1206, N0) and fails to show a normal congestion state (1210, NO), the congestion state is set to moderate (1214). Whenever the congested state is updated (1208, 1212, 1214), the timer is reset (1216).

For the special case of "best effort" QOS cell relay connections, where SCR=0, the present invention is simplified. Specifically, all cells entering the network are in violation of the SCR=0 traffic parameter and may be pretagged with CLP=1, thus eliminating the need for the leaky bucket monitor (204). In addition, the cell rate determiner (504) may remain in the R=DCR state for the entire duration of the best effort cell relay connection, thus simplifying the overall operation of the cell scheduler (206).

Thus, the device of the present invention, a cell flow regulator, adjusts and monitors the cell flow at an ATM end system based on: congestion feedback information (from source edge node, intermediate nodes, destination edge node, or destination end system), current cell rate monitored by a leaky bucket monitor and data source status (i.e., if there are cells waiting to send). The invention provides a feedback, closed-loop rate control system. The invention provides a major improvement by effectively controlling the cell flow at the end system by coupling the data source, congestion feedback information, and leaky bucket state, whereas previous techniques are either only applied at network nodes for policing and are based on open-loop congestion control strategies, or do not provide a simple and effective coupling with a leaky bucket state and the data source state.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A device for providing cell relay end system cell flow regulation in a communication network by adjusting and monitoring cell flow for cell relay connections emanating from the cell relay end system, comprising:

(A) a congestion state determiner, operably coupled to receive congestion feedback information in the network, for utilizing the congestion feedback information to determine the congestion state, (B) a cell scheduler, operably coupled to the congestion state determiner, a data source and a leaky bucket monitor, for transmitting a send-cell signal to the data source based on the congestion feedback information, a current cell rate monitored by the leaky bucket monitor, and a data source status, (C) the data source, operably coupled to the cell scheduler, for transmitting a data source status to the cell scheduler and, upon receiving the send cell signal, sending a cell to the leaky bucket monitor, and (D) the leaky bucket monitor, operably coupled to the data source, for, upon receiving a cell from the data source, transmitting an updated leaky bucket state to the cell scheduler and sending the cell to the communication network wherein the data source includes:

(E) a cell generator, for generating cells through adaptation Of higher level Protocol Data Units, PDU, (F) a cell buffer, operably coupled to the cell generator, for storing the generated cell until transmission, (G) a cell flow switch, operably coupled to the cell buffer and to the cell scheduler, for, where cell buffer has at least one stored cell, upon receiving a send-cell signal from the cell scheduler, sending a cell to the leaky bucket monitor, and (H) a cell buffer state determiner, operably coupled to the cell buffer, for determining whether the state of the cell buffer is empty or contains cell(s), and for, upon the cell buffer state changing, transmitting the cell buffer state to the cell scheduler, wherein the leaky bucket monitor monitors a predetermined sustainable cell rate SCR, and an associated predetermined burst tolerance, BT, traffic parameters for network connections, wherein the leaky bucket monitor further determines whether a cell passing through the leaky bucket monitor is in violation of i.e., is non-conforming with, predetermined negotiated SCR and BT traffic parameters, and wherein:
where the leaky bucket monitor is non-conforming, the CLP, cell loss priority, field in a cell header is set to 1 and the leaky bucket state is set to violation,
where the leaky bucket is conforming, the CLP is set to 0 and the leaky bucket state is set to normal, and
the leaky bucket monitor signals the leaky bucket state changes to the cell scheduler.

2. The device of claim 1 wherein the congestion feedback information is provided by at least one of: a source edge node, intermediate node, destination edge node, and a destination end system of the network.

3. The device of claim 1 wherein the cell scheduler includes:

(A) a Dynamic Cell Rate, DCR, determiner, operably coupled to receive the congestion state and the cell buffer state, for establishing the DCR, which varies between the SCR, a predetermined sustainable cell rate, and a predetermined Peak Cell Rate, PCR, where SCR≦PCR, in accordance with the congestion state and the cell buffer state, (B) a cell rate determiner, operably coupled to the DCR determiner and to the data source, for determining a current cell flow rate R based on one of: PCR and a current value of DCR, in correspondence with transitions in the leaky bucket state and cell buffer state, (C) a Next Cell Time Determiner, operably coupled to the cell rate determiner, for scheduling a next time a cell is allowed to enter the network and, at the next time, sending a send-cell signal to the data source.

4. The device of claim 3 wherein state transition diagram for the cell rate determiner includes:

(A) a R=PCR state, where the leaky bucket monitor is in a normal state, and a number of cells that can be transmitted continuously at the PCR are still within predetermined negotiated traffic parameters in correspondence with SCR and BT, along with a current value of the leaky bucket Q parameter, and (B) a R=DCR state, coupled to the R=PCR state, for becoming a current state where the number of cells that can be transmitted continuously at the PCR is outside the predetermined negotiated traffic parameters and the leaky bucket state changes to violation, remaining in the R=DCR state as long as there are cells waiting in the data source cell buffer to be transmitted, and when the cell buffer is empty, transitioning back to the R=PCR state.

5. The device of claim 3 wherein, where there are two predetermined congestion states, i.e., congested and normal, the DCR determiner is periodically updated.

6. The device of claim 5 wherein, upon the establishment of a new connection, DCR is initially set to SCR, and one of:

(A) the DCR determiner adjusts the cell rate by additive increase algorithm(s) when the congestion state is normal and a cell is available, a magnitude of DCR is compared with PCR, and where DCR is less than or equal to PCR, the DCR determination is completed, and where DCR is greater than PCR, DCR is set equal to PCR and the DCR determination is completed, (B) the DCR determiner adjusts the cell rate by multiplicative decrease algorithm(s) when one of:

(B1) the congestion state fails to be normal, and (B2) when the congestion state is normal and a cell is unavailable, such that upon adjusting the DCR by an multiplicative decrease, the magnitude of DCR is compared with SCR, and where DCR is greater than or equal to SCR, the DCR determination is completed, and where DCR is less than SCR, DCR is set equal to SCR and the DCR determination is completed.

7. The device of claim 6 wherein the multiplicative decrease algorithm utilizes a multiplicative decrease factor d that is set to the equivalent of 0.875 for every two round trip times in the network (i.e., with an update interval of RTT/4, $d=(0.875)^{0.125}=0.983$).

8. The device of claim 6 wherein the additive increase algorithm utilizes an increase increment b that is set to the equivalent of SCR/16 for every two round trips (i.e., with an update interval of RTT/4, b=SCR/128).

9. The device of claim 6 wherein the additive increase algorithm, for "best effort" traffic with SCR=0, utilizes an increase increment b that is set to 0.1% of a lowest capacity internodal link along a path of a connection for a RTT/4, where RTT is a round trip time, update interval.

10. The device of claim 3, wherein the DCR determiner, where there are three predetermined congestion states (normal, mild and moderate), adjusts the cell rate by additive increase algorithm(s) when the congestion state is normal and a cell is available and by multiplicative decrease algorithm(s) when one of: (1) the congestion state fails to be normal and is determined to be mild, and (2) the congestion state is normal and a cell is unavailable, and where, upon adjusting the DCR by an additive increase, the magnitude of DCR is compared with PCR such that where DCR is less than or equal to PCR, the DCR determination is completed, and where DCR is greater than PCR, DCR is set equal to PCR and the DCR determination is completed, and, where upon adjusting the DCR by an multiplicative decrease, the magnitude of DCR is compared with SCR such that where DCR is greater than or equal to SCR, the DCR determination is completed, and where DCR is less than SCR, DCR is set equal to SCR and the DCR determination is completed, and where the congestion state fails to be normal and also fails to be mild, DCR is set equal to SCR and the DCR determination is completed.

11. The device of claim 3 wherein the DCR determiner, when there are two predetermined congestion states (congested and normal) and an Initial Cell Rate (ICR), with SCR≦ICR≦PCR, where initially DCR=ICR, adjusts the cell rate by additive increase and multiplicative decrease algorithms based on the two congestion states and cell buffer state such that, when the cell buffer is empty, DCR is driven to ICR by the multiplicative decrease algorithm when DCR>ICR, and remains unchanged when DCR≦ICR, and thus adjusts the cell rate by additive increase algorithm(s) when the congestion state is normal and a cell is available and by multiplicative decrease algorithm(s) when one of: (1) the congestion state fails to be normal and (2) the congestion state is normal, a cell is unavailable, and DCR>ICR, and such that, upon adjusting the DCR by an additive increase, the magnitude of DCR is compared with PCR such that where DCR is less than or equal to PCR, the DCR determination is completed, and where DCR is greater than PCR, DCR is set equal to PCR and the DCR determination is completed, and where the congestion state fails to be normal, upon adjusting the DCR by an multiplicative decrease, the magnitude of DCR is compared with SCR and where DCR is greater than or equal to SCR, the DCR determination is completed, and where DCR is less than SCR, DCR is set equal to SCR and the DCR determination is completed and, when the congestion state is normal and the cell buffer is empty, DCR is compared with ICR, such that where DCR≦ICR, the DCR determination is completed, and where DCR>ICR, DCR is adjusted by a multiplicative decrease and DCR is again compared to ICR, and where DCR≦ICR, the DCR determination is completed, and where DCR<ICR, DCR is set equal to ICR and the DCR determination is completed.

12. The device of claim 3 wherein the DCR determiner has three predetermined congestion states (normal, mild and moderate) and ICR, with SCR≦ICR≦PCR, and the DCR determiner adjusts the cell rate by additive increase algorithm(s) when the congestion state is normal and a cell is available and by multiplicative decrease algorithm(s) when one of: (1) the congestion state fails to be normal, and the congestion state is mild, and (2) the congestion state is normal, a cell is unavailable, and DCR>ICR, such that, upon adjusting the DCR by an additive increase, the magnitude of DCR is compared with PCR, and where DCR is less than or equal to PCR, the DCR determination is completed, and where DCR is greater than PCR, DCR is set equal to PCR and the DCR determination is completed, and where the congestion state fails to be normal and the congestion state is mild, upon adjusting the DCR by a multiplicative decrease, the magnitude of DCR is compared with SCR, and where DCR is greater than or equal to SCR, the DCR determination is completed, and where DCR is less than SCR, DCR is set equal to SCR and the DCR determination is completed, and where the congestion state fails to be normal and also fails to be mild, DCR is set equal to SCR and the DCR determination is completed, and when the congestion state is normal and the cell buffer is empty, DCR is compared with ICR, and where DCR≦ICR, the DCR determination is completed, and where DCR>ICR, DCR is adjusted by a multiplicative decrease and DCR is again compared to ICR, and where DCR≧ICR, the DCR determination is completed, and where DCR<ICR, DCR is set equal to ICR and the DCR determination is completed.

13. The device of claim 1 further including a preset timer, operably coupled to receive congestion feedback information, and wherein the congestion state determiner has two predetermined congestion states (congested and normal), the congestion state determiner is triggered based on one of: (1) receiving congestion feedback information from the network, and (2) having the timer expire, such that if the timer expires before the congestion feedback information is received, the congestion state is set to the congested state, and otherwise, the congestion feedback information is mapped directly to the congestion state such that where the congestion feedback information indicates a congested state, the congestion state is set to the congested state and where the congestion feedback information indicates an uncongested state, the congestion state is set to normal and such that whenever the congested state is updated, the timer is reset.

14. The device of claim 1 further including a preset timer, operably coupled to receive congestion feedback information, and wherein the congestion state determiner has three predetermined congestion states (normal, mild, and moderate), such that when the timer expires before congestion feedback information is received, the congestion state is set to the mild congestion state, and the congestion state determiner is triggered based on one of: (1) receiving congestion feedback information from the network, and (2) having the timer expire, and wherein, if the timer expires before the congestion feedback information is received, the congestion state is set to the mild state, and otherwise, the congestion feedback information is mapped directly to the congestion state such that where the congestion feedback information indicates a mild state, the congestion state is set to the mild state and where the congestion feedback information fails to show a mild congestion state and shows a normal congestion state, the congestion state is set to normal and where the congestion feedback information fails to show a mild congestion state and fails to show a normal congestion state, the congestion state is set to moderate and whenever the congested state is updated, the timer is reset.

15. A method for providing cell relay end system cell flow regulation in a communication network by adjusting and monitoring cell flow for cell relay connections emanating from the cell end system, comprising the steps of:

(A) utilizing network congestion feedback information to determine the congestion state, (B) utilizing a cell scheduler for transmitting a send cell signal to a data source based on the congestion feedback information, a current cell rate monitored by a leaky bucket monitor, and a data source status, (C) utilizing the data source for transmitting a data source status to the cell scheduler and, upon receiving the send cell signal, sending a cell to the leaky bucket monitor, and (D) utilizing the leaky bucket monitor for, upon receiving a cell from the data source, transmitting an updated leaky bucket state to the cell scheduler and sending the cell to the communication network, wherein steps implemented by data source include:

(E) generating cells through adaptation of higher level Protocol Data Units (PDUs), (F) storing the generated cell until transmission, (G) where the cell buffer has at least one stored cell, upon receiving a send-cell signal from the cell scheduler, sending a cell to the leaky bucket monitor, and (H) determining whether the state of the cell buffer is empty or contains cell(s), and for, upon the cell buffer state changing, transmitting the cell buffer state to the cell scheduler, including the step of the leaky bucket monitor monitoring a predetermined sustainable cell rate (SCR) and an associated predetermined burst tolerance, BT, traffic parameters for network connections, including the leaky bucket monitor determining whether a cell passing through the leaky bucket monitor is non-conforming with predetermined negotiated SCR and BT traffic parameters, and including the steps of:
where the leaky bucket monitor is non-conforming, the CLP, cell loss priority, field in a cell header is set to 1 and the leaky bucket state is set to violation,
where the leaky bucket is conforming, the CLP is set to 0 and the leaky bucket state is set to normal, and
the leaky bucket monitor signals the leaky bucket state changes to the cell scheduler.

16. The method of claim 15 further including that the congestion feedback information is provided by at least one of: a source edge node, intermediate node, destination edge node, and a destination end system of the network.

17. The method of claim 15 wherein the steps utilized by the cell scheduler include:

(A) establishing the DCR, which varies between the SCR and a predetermined Peak Cell Rate (PCR) where SCR≤PCR, in accordance with the congestion state and the cell buffer state, (B) determining a current cell flow rate R based on one of: PCR and a current value of DCR, in correspondence with transitions in the leaky bucket state and cell buffer state, and (C) scheduling a next time (i.e., 1/R) a cell is allowed to enter the network and, at the next time, sending a send-cell signal to the data source.

18. The method of claim 17 wherein determining a current cell flow rate R includes utilizing a state transition diagram that includes:

(A) a R=PCR state, where the leaky bucket monitor is in a normal state (generally referred to as the leaky bucket having "permits" to send cells at the PCR), and a number of cells that can be transmitted continuously at the PCR are still within predetermined negotiated traffic parameters in correspondence with SCR and BT, along with a current value of the leaky bucket Q parameter, and (B) a R=DCR state, coupled to the R=PCR state, for becoming a current state where the number of cells that can be transmitted continuously at the PCR is outside the predetermined negotiated traffic parameters and the leaky bucket state changes to violation, remaining in the R=DCR state as long as there are cells waiting in the data source cell buffer to be transmitted, and when the cell buffer is empty, transitioning back to the R=PCR state.

19. The method of claim 17 wherein, where there are two predetermined congestion states, i.e., congested and normal, the establishing the DCR includes periodically updating the DCR.

20. The method of claim 19 wherein, upon the establishment of a new connection, DCR is initially set to SCR, and one of:

(A) adjusting the cell rate by additive increase algorithm(s) when the congestion state is normal and a cell is available, a magnitude of DCR is compared with PCR, and where DCR is less than or equal to PCR, the DCR determination is completed, and where DCR is greater than PCR, DCR is set equal to PCR and the DCR determination is completed, (B) adjusting the cell rate by multiplicative decrease algorithm(s) when one of:

(B1) the congestion state fails to be normal, and (B2) when the congestion state is normal and a cell is unavailable, such that upon adjusting the DCR by an multiplicative decrease, the magnitude of DCR is compared with SCR, and where DCR is greater than or equal to SCR, the DCR determination is completed, and where DCR is less than SCR, DCR is set equal to SCR and the DCR determination is completed.

21. The method of claim 20 wherein adjusting the cell rate by the multiplicative decrease algorithm includes utilizing a multiplicative decrease factor d that is set to the equivalent of 0.875 for every two round trip times in the network (i.e., with an update interval of RTT/4, $d=(0.875)^{0.125}$ 32 0.983).

22. The method of claim 20 wherein adjusting the cell rate by the additive increase algorithm includes utilizing an increase increment b that is set to the equivalent of SCR/16 for every two round trips (i.e., with an update interval of RTT/4, b=SCR/128).

23. The method of claim 20 wherein adjusting the cell rate by the additive increase algorithm, for "best effort" traffic with SCR=0, includes utilizing an increase increment b that is set to 0.1% of a lowest capacity internodal link along a path of a connection for a RTT/4 update interval.

24. The method of claim 17 further including, where there are three predetermined congestion states (normal, mild and moderate), adjusting the cell rate by additive increase algorithm(s) when the congestion state is normal and a cell is available and by multiplicative decrease algorithm(s) when one of: (1) the congestion state fails to be normal and is determined to be mild, and (2) the congestion state is normal and a cell is unavailable, and where, upon adjusting the DCR by an additive increase, the magnitude of DCR is compared with PCR such that where DCR is less than or equal to PCR, the DCR determination is completed, and where DCR is greater than PCR, DCR is set equal to PCR and the DCR determination is completed, and where, upon adjusting the DCR by an multiplicative decrease, the magnitude of DCR is compared with SCR such that where DCR is greater than or equal to SCR, the DCR determination is completed, and where DCR is less than SCR, DCR is set equal to SCR and the DCR determination is completed, and where the congestion state fails to be normal and also fails to be mild, DCR is set equal to SCR and the DCR determination is completed.

25. The method of claim 17, further including, when there are two predetermined congestion states (congested and normal) and an Initial Cell Rate (ICR), with SCR≦ICR≦PCR, where initially DCR=ICR, adjusting the cell rate by additive increase and multiplicative decrease algorithms based on the two congestion states and cell buffer state such that, when the cell buffer is empty, DCR is driven to ICR by the multiplicative decrease algorithm when DCR>ICR, and remains unchanged when DCR≦ICR, and thus adjusts the cell rate by additive increase algorithm(s) when the congestion state is normal and a cell is available and by multiplicative decrease algorithm(s) when one of: (1) the congestion state fails to be normal and (2) the congestion state is normal, a cell is unavailable, and DCR>ICR, and such that, upon adjusting the DCR by an additive increase, the magnitude of DCR is compared with PCR such that where DCR is less than or equal to PCR, the DCR determination is completed, and where DCR is greater than PCR, DCR is set equal to PCR and the DCR determination is completed, and where the congestion state fails to be normal, upon adjusting the DCR by an multiplicative decrease, the magnitude of DCR is compared with SCR and where DCR is greater than or equal to SCR, the DCR determination is completed, and where DCR is less than SCR, DCR is set equal to SCR and the DCR determination is completed and, when the congestion state is normal and the cell buffer is empty, DCR is compared with ICR, such that where DCR≦ICR, the DCR determination is completed, and where DCR>ICR, DCR is adjusted by a multiplicative decrease and DCR is again compared to ICR, and where DCR≧ICR, the DCR determination is completed, and where DCR <ICR, DCR is set equal to ICR and the DCR determination is completed.

26. The method of claim 17, further including, where there are three predetermined congestion states (normal, mild and moderate) and ICR, with SCR≦ICR≦PCR, adjusting the cell rate by additive increase algorithm(s) when the congestion state is normal and a cell is available and by multiplicative decrease algorithm(s) when one of: (1) the congestion state fails to be normal, and the congestion state is mild, and (2) the congestion state is normal, a cell is unavailable, and DCR> ICR, such that, upon adjusting the DCR by an additive increase, the magnitude of DCR is compared with PCR, and where DCR is less than or equal to PCR, the DCR determination is completed, and where DCR is greater than PCR, DCR is set equal to PCR and the DCR determination is completed, and where the congestion state fails to be normal and the congestion state is mild, upon adjusting the DCR by a multiplicative decrease, the magnitude of DCR is compared with SCR, and where DCR is greater than or equal to SCR, the DCR determination is completed, and where DCR is less than SCR, DCR is set equal to SCR and the DCR determination is completed, and where the congestion state fails to be normal and also fails to be mild, DCR is set equal to SCR and the DCR determination is completed, and when the congestion state is normal and the cell buffer is empty, DCR is compared with ICR, and where DCR≦ICR, the DCR determination is completed, and where DCR>ICR, DCR is adjusted by a multiplicative decrease and DCR is again compared to ICR, and where DCR≧ICR, the DCR determination is completed, and where DCR<ICR, DCR is set equal to ICR and the DCR determination is completed.

27. The method of claim 15 further including, wherein the congestion state determiner has two predetermined congestion states (congested and normal) and the congestion state determiner is triggered based on one of: (1) receiving congestion feedback information from the network, and (2) having a timer expire, such that if the timer expires before the congestion feedback information is received, the congestion state is set to the congested state, and otherwise, the congestion feedback information is mapped directly to the congestion state such that where the congestion feedback information indicates a congested state, the congestion state is set to the congested state and where the congestion feedback information indicates an uncongested state, the congestion state is set to normal and such that whenever the congested state is updated, the timer is reset.

28. The method of claim 15, further including, wherein the congestion state determiner has three predetermined congestion states (normal, mild, and moderate), such that when a timer expires before congestion feedback information is received, the congestion state is set to the mild congestion state, and the congestion state determiner is triggered based on one of: (1) receiving congestion feedback information from the network, and (2) having the timer expire, and wherein, if the timer expires before the congestion feedback information is received, the congestion state is set to the mild state, and otherwise, the congestion feedback information is mapped directly to the congestion state such that where the congestion feedback information indicates a mild state, the congestion state is set to the mild state and where the congestion feedback information fails to show a mild congestion state and shows a normal congestion state, the congestion state is set to normal and where the congestion feedback information fails to show a mild congestion state and fails to show a normal congestion state, the congestion state is set to moderate and whenever the congested state is updated, the timer is reset.

* * * * *

UNITED STATES PATENT AND TRADEMARK OFFICE
CERTIFICATE OF CORRECTION

PATENT NO. : 5,497,375
DATED : 03/05/96
INVENTOR(S) : Michael G. Hluchyj and Nanying Yin It is certified that error appears in the above-indentified patent and that said Letters Patent is hereby corrected as shown below:

Col. 8, line 33, "of" should read --of--.

Column 8, Line 33 "PDU," should read --PDUs,--.

Column 13, Line 46 "d-(0.875)$^{0.125}$32 0.983) should read --d=(0.875)$^{0.125}$32.0.983)--.

Signed and Sealed this

Sixth Day of August, 1996

BRUCE LEHMAN

*Attest:*

*Attesting Officer*     Commissioner of Patents and Trademarks